Figure 2:
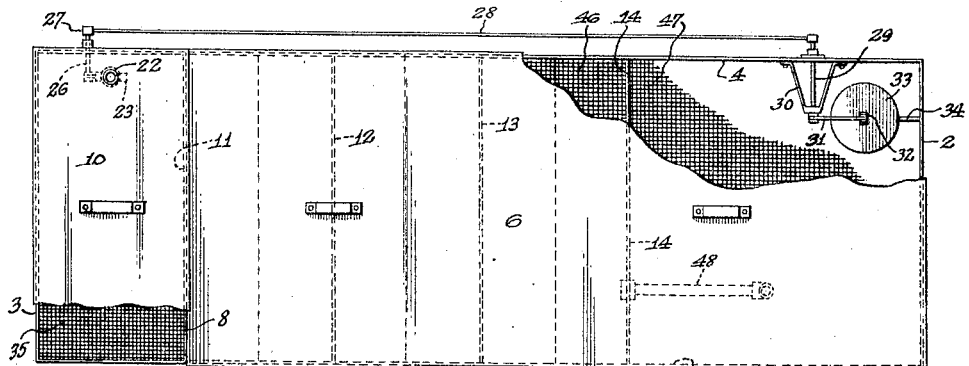

March 16, 1926.

L. M. PERRY 1,576,930

OIL FILTERING APPARATUS

Filed Dec. 19, 1923

Inventor
Leo M. Perry,
By

Patented Mar. 16, 1926.

1,576,930

UNITED STATES PATENT OFFICE.

LEO M. PERRY, OF ST. HELEN, MICHIGAN.

OIL-FILTERING APPARATUS.

Application filed December 19, 1923. Serial No. 681,487.

*To all whom it may concern:*

Be it known that I, LEO M. PERRY, a citizen of the United States, residing at St. Helen, in the county of Roscommon and State of Michigan, have invented certain new and useful Improvements in Oil-Filtering Apparatus, of which the following is a specification, reference being had therein to the accompanying drawings.

This invention relates to an oil filtering apparatus and my invention aims to provide an apparatus by which lubricating oils and the like may be expediently filtered so that such oils may be used over and over again. It is in this connection that the filtering apparatus may be advantageously used for removing dirt, grit and foreign matter from the lubricating oils which have been used in connection with an internal combustion engine, it being a well known fact that the crank cases of automobile engines are drained, from time to time, and the oil usually thrown away. This oil I intend to save, clean it, and again use it, and continue to do so until its lubricating properties are practically nil.

My invention further aims to provide an oil filtering apparatus wherein a series of tanks or compartments are placed in communicating relation so that oil may flow from one compartment to another and in doing so pass through filtering beds which are adapted to remove foreign matter or provide a removable surface upon which sediment may collect. The arrangement of the compartments and filtering beds in such that a circulation of oil will be maintained in all compartments allowing the lighter oils to pass off quickly leaving the residue in the filtering beds or a sediment thereon, and from time to time the apparatus may have its filtering beds renewed and the interior of the apparatus flushed and thoroughly cleansed. To do this provision is made for maintaining the cleaned or filtered oil in the separate compartment or reservoir from which it may be easily removed, and provision is made to automatically control the supply of unfiltered oil to the filtering apparatus, so that the apparatus may be used and operated without constant attention.

My invention will be hereinafter specifically described and then claimed, and reference will now be had to the drawing, wherein—

Figure 1:
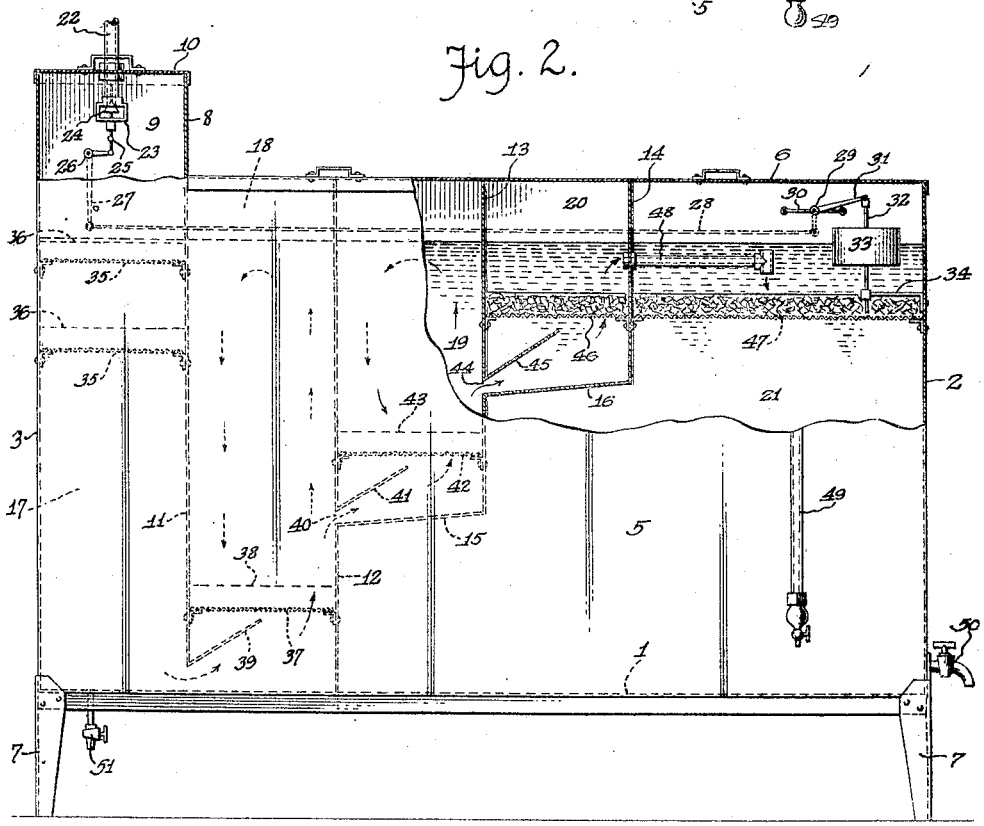

Figure 1 is a front elevation of the oil filtering apparatus, partly broke away and partly in section, and Fig. 2 is a plan of the same.

The filtering apparatus comprises an oblong tank having a bottom wall 1, end walls 2 and 3, a rear wall 4, a front wall 5, and a detachably top wall or cover 6. The tank may be supported by a plurality of legs 7 and at one end of the tank the walls 3, 4 and 5 are of greater height than the remaining walls and cooperate with a transverse wall 8 in providing an inlet casing or compartment 9 having a detachable cover 10. As a continuation of the transverse wall 8 there is a partition 11 connecting the walls 4 and 5 and extending in proximity to the bottom wall 1. The walls 4 and 5 are connected by additional transversely disposed partitions 12, 13 and 14, these partitions varying in height with the partition 12 the full depth of the tank: the partition 13 approximately half the depth of the tank and connected to the partition 12 by a transverse inclined wall 15, while the partition 14 is approximately one-third of the depth of the tank and is connected to the partition 13 by a transverse inclined bottom wall 16.

The arrangement of the partitions 11 and 14 inclusive and the bottom walls 15 and 16 is such as to provide a plurality of progressively stepped communicating filtering compartments 17, 18, 19 and 20, also a storage or clean oil compartment 21 which occupies approximately one-half of the tank.

Extending into the casing 9, preferably through the cover 10, is an oil inlet pipe 22 and on the inner end of said pipe is a cage 23 for a control valve 24 connected by links 25 or other means to a rock crank shaft 26 supported by the wall 4 of the tank. The outer end of the rock shaft 26 has a long crank 27 connected by a reach rod 28 to another rock crank shaft 29 supported by the wall 4 and a bearing bracket 30 carried by the inner face of said wall. The inner end of the rock shaft 29 is provided with a long crank 31 loosely connected to a float rod 32 provided with a float or buoyant body 33, said float rod being guided by a bracket 34 carried by the wall 2.

The float 33 is located in the upper part of the storage compartment 21 and the level of cleaned oil in said compartment will govern the position of the valve 24 and the inlet of unclean oil. The supply of oil of the pipe 22 is preferably regulated so that the oil will drip into the casing 9 and the float actuated valve is employed as a safety factor.

In the filtering compartment 17, below the casing 9, are placed superposed detachable screens 35, preferably made of metal and of such a mesh as to afford a supporting surface for a filtering bed 36 on each screen. The filtering beds may be of any well known filtering material, such as mineral wool, wood shavings or the like and in this particular compartment the filtering beds may be comparatively coarse so as to remove iron filings, metallic particles, and other foreign coarse matter that may be carried into the compartment along with the supply of oil.

In the compartment 18, in proximity to the bottom thereof, is placed a detachable screen 37 and a filtering bed 38, both of which may be a few degrees finer than the screens 35 and the filtering beds 36. Below the screen 37 and supported by the walls 4 and 5 and the partition 11 in an inclined deflector 39 and oil flowing from the bottom of the compartment 17, under the partition 11, is deflected towards the partition 12 to pass upwardly through the screen 37 and the filtering bed 38, taking a path of travel as indicated by the arrows in the compartment 18, Fig. 1. The path of travel is somewhat circuitous, and the circulation maintained will permit the lighter oils to pass through an opening 40, under a deflector 41, in the compartment 19, while the heavier oils will tend to accumulate above the filtering bed so that heavy particles of matter in the oil may settle on the filtering bed.

In the compartment 19, above the deflector 41 is a screen 42 and a filtering bed 43, both of which may be finer than previously mentioned screens or filter beds. The compartment 19 communicates with the compartment 20 through an opening 44 at a deflector 45 in the compartment 20, and above the deflector 45 is a fine screen 46. In some instances the filtering bed may be placed on this screen and a finer or smaller screen 47 is arranged in the upper part of the compartment 21, preferably on the same level as the screen 46.

The partition 14 is provided with a pipe 48 establishing communication between the compartments 20 and 21 and the compartment 21 communicates with a sight gauge 49 carried by the front wall 5.

Clean oil may be obtained from the lower part of the compartment 21 by a faucet 50 and foreign matter may be drained from the bottom of the compartments 17 and 18 through a valved drain pipe 51 carried by the bottom wall 1 of the tank. With the bottom walls 15 and 16 inclined it is obvious that oil will drain into the compartments 18 and 19 respectively and any foreign matter held in suspension by the oil will accumulate on or in the filtering beds 38 and 43, and by removing the covers 6 and 10 the screens and filtering beds may be removed, cleansed or renewed. It is at such time that the interior of the compartments 17 to 20 may be cleansed by using kerosene or some detergent which will attract such films of filth as have accumulated on the walls of the various compartments, and all of this may be accomplished particularly when the level of cleaned oil in the compartment 21 is below the inlet pipe 48 of said compartments. The float 33 will retain the valve 24 closed and the oil in the compartments 17 to 20 inclusive may be maintained throughout and said compartments thoroughly cleaned and placed in the best of condition.

From the foregoing it will be observed that the filtering of oil is accomplished by the specific gravity of foreign matter in the oil. The fine foreign matter may be held back by means of filtering beds and such foreign matter that does pass through the beds has a chance to accumulate on the beds as a sediment due to the slow circulating movement of oil in the compartments of the filtering apparatus. Any suitable means may be employed for maintaining an overhead supply of unclean oil for the filtering apparatus, and with such an apparatus located at an automobile supply station it is possible to save the drained lubricating oils from automobiles, filter it and again use it. The filtering apparatus, on a small scale, may be used by individuals or individuals may reclaim their lubricating oils after having been filtered at a supply station.

It is thought that the utility and operation of the filtering apparatus will be apparent without further description, and while in the drawing there is illustrated a preferred embodiment of my invention it is to be understood that the structural elements are susceptible to such variation and modifications as fall within the scope of the appended claim.

What I claim is:—

An oil filtering apparatus comprising a tank having an inlet at one end and an outlet at its opposite end, partitions in said tank forming a storage compartment and a plurality of filtering compartments, the storage compartment being approximately half the length of said tank and extending under three of the filtering compartments, all of said filtering compartments being progressively stepped in depth with the lower ends of said filtering compartments communicating with one another and two of the filtering compartments above the storage compartment provided with inclined bottom walls, and filtering means in said filtering compartments with the filtering means in the progressively stepped compartments in proximity to the inclined bottom walls thereof.

In testimony whereof I affix my signature.

LEO M. PERRY.